(12) United States Patent
Steadman Booker et al.

(10) Patent No.: US 11,029,425 B2
(45) Date of Patent: Jun. 8, 2021

(54) PHOTON-COUNTING IN A SPECTRAL RADIATION DETECTOR

(71) Applicant: KONINKLIJKE PHILIPS N.V., Eindhoven (NL)

(72) Inventors: Roger Steadman Booker, Aachen (DE); Ewald Roessl, Ellaru (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 199 days.

(21) Appl. No.: 16/305,425

(22) PCT Filed: Jun. 16, 2017

(86) PCT No.: PCT/EP2017/064838
§ 371 (c)(1),
(2) Date: Nov. 29, 2018

(87) PCT Pub. No.: WO2017/216378
PCT Pub. Date: Dec. 21, 2017

(65) Prior Publication Data
US 2020/0326437 A1    Oct. 15, 2020

(30) Foreign Application Priority Data
Jun. 16, 2016  (EP) .................................... 16174692

(51) Int. Cl.
*G01T 1/24* (2006.01)
*G01T 1/17* (2006.01)

(52) U.S. Cl.
CPC ............. *G01T 1/247* (2013.01); *G01T 1/171* (2013.01)

(58) Field of Classification Search
CPC ............ G01T 1/247; G01T 1/171; G01T 1/17
(Continued)

(56) References Cited

U.S. PATENT DOCUMENTS 7,829,860 B2 * 11/2010 Nygard ..................... G01T 1/17
                                                     250/370.09
8,338,791 B2 * 12/2012 Proksa .................... G01T 1/171
                                                        250/369
(Continued)

FOREIGN PATENT DOCUMENTS

WO     2008/146218     12/2008
WO     2008/146230     12/2008
WO     WO-2008146230 A2 *  12/2008  ............. G01T 1/171

OTHER PUBLICATIONS

E. Roessl et al., "On the analogy between pulse-pile up in energy sensitive, photon counting detectors and level-crossing of shot noise", Proc. SPIE 9783, Medical Imaging 2016: Physics of Medical Imaging, 97831H (Mar. 25, 2016).
(Continued)

*Primary Examiner* — Kiho Kim
(74) *Attorney, Agent, or Firm* — Larry Liberchuk

(57) ABSTRACT

The invention relates to radiation detector for registering incident photons, comprising (i) detection circuitry (202, 206, 207) configured to provide an electric output signal in response to incident photons, the output signal comprising pulses having an amplitude indicative of energies deposited in the radiation detector by the incident photons, and (ii) an energy estimating circuit ($208_1, \ldots, 208_N; 209_1, \ldots, 209_N$) configured to detect that the output signal is larger than at least one threshold corresponding to an energy value in order to determine energies of incident photons. The radiation detector further comprises a registration circuit (211) configured to detect incident photons independent of a comparison of the output signal with the at least one threshold. Moreover, the invention relates to a method for detecting photons using the radiation detector.

10 Claims, 3 Drawing Sheets

(58) Field of Classification Search
USPC .................................................. 250/370.08
See application file for complete search history.

(56) References Cited

U.S. PATENT DOCUMENTS

| | | | | |
|---|---|---|---|---|
| 9,851,460 | B1* | 12/2017 | Rodrigues | G01T 1/247 |
| 10,078,009 | B2* | 9/2018 | Daerr | G01T 1/171 |
| 2010/0051818 | A1* | 3/2010 | De Geronimo | G01T 1/247 |
| | | | | 250/370.01 |
| 2010/0187432 | A1* | 7/2010 | Herrmann | G01T 1/171 |
| | | | | 250/395 |
| 2010/0193700 | A1* | 8/2010 | Herrmann | G01T 1/171 |
| | | | | 250/395 |
| 2010/0270473 | A1* | 10/2010 | Kraft | G01T 1/17 |
| | | | | 250/389 |
| 2011/0036989 | A1* | 2/2011 | Marks | G01T 1/17 |
| | | | | 250/370.08 |
| 2011/0210235 | A1* | 9/2011 | Dierickx | G01T 1/17 |
| | | | | 250/214 R |
| 2011/0248765 | A1* | 10/2011 | Turner | G01T 1/2985 |
| | | | | 327/306 |
| 2012/0280131 | A1* | 11/2012 | Spartiotis | H04N 5/347 |
| | | | | 250/366 |
| 2012/0305757 | A1* | 12/2012 | Kappler | G01T 1/40 |
| | | | | 250/252.1 |
| 2014/0016748 | A1* | 1/2014 | Spahn | H04N 5/37452 |
| | | | | 378/62 |
| 2015/0185332 | A1* | 7/2015 | Herrmann | G01T 1/171 |
| | | | | 250/336.1 |
| 2015/0327827 | A1* | 11/2015 | Teshigawara | A61B 6/032 |
| | | | | 378/19 |
| 2016/0033654 | A1* | 2/2016 | Tamura | G01T 1/2985 |
| | | | | 378/98.9 |
| 2016/0282476 | A1* | 9/2016 | Kappler | G01T 1/17 |

OTHER PUBLICATIONS

Hsieh, et al., "Improving pulse detection in multibin photon counting detectors", J. of Medical Imaging, 3(2), 023505 (2016).

* cited by examiner

PHOTON-COUNTING IN A SPECTRAL RADIATION DETECTOR

CROSS REFERENCE TO RELATED APPLICATIONS

This application is the U.S. National Phase application under 35 U.S.C. § 371 of International Application No. PCT/EP2017/064838, filed Jun. 16, 2017 published as WO 2017/216378 on Dec. 21, 2017, which claims the benefit of European Patent Application Number 16174692.0 filed Jun. 16, 2016. These applications are hereby incorporated by reference herein.

FIELD OF THE INVENTION

The invention generally relates to spectral radiation detectors. More specifically, the invention relates to a radiation detector for detecting incident photons and to a method for detecting photons using the radiation detector.

BACKGROUND OF THE INVENTION

So-called spectral or photon-counting x-ray detectors allow for detecting incident x-ray photons individually and for determining their energies in accordance with predetermined energy bins (corresponding to certain energy ranges). For this purpose, the detectors comprises a direct conversion material which produces a pulse-like electric current signal each time a photon enters the material, where the current pulse corresponds to an amount of charge which is indicative of the photon energy. The current signals of successively arriving photons are processed in read-out electronics of the detector to produce an output signal comprising a pulse train in which each event (e.g. an incident photon) corresponds to a pulse having a certain width and an amplitude proportional to the energy of the incident photon.

The pulses within the output signal can be detected and their amplitudes can be compared with threshold values in order to count the incident photons and determine the energy bins for these photons. To this end, circuitry may be associated with each energy bin, which includes a counter that is incremented when the output signal exceeds a threshold which corresponds to the lower boundary of the respective energy bin. On the basis of the counter outputs it is possible to determine the rate of incident photons per energy bin. This rate information may be provided to a reconstruction unit which generates x-ray images on the basis of this information.

In the evaluation of the aforementioned output signal, a problem occurs when pulses for consecutive photons overlap in the output signal in such a way that the signal does not fall below one or more of the predetermined thresholds between the pulses. This is also known as pile-up. In case of pile-up, the pulses cannot be distinguished from each other and counted as one single pulse. This results in lost counts and corresponding artifacts in the generated images.

Such artifacts impair the quality of spectral x-ray images, which are generated on the basis of the individual photon rates respectively determined for the energy bins. Moreover, photon-counting detectors can be used for generating conventional x-ray images independent of the determined energy information in certain applications. Such images may be generated on the basis of the overall photon rate determined for all energy bins (corresponding to the rate of photons producing a pulse in the output signal which is higher than the lowest threshold, i.e. the threshold corresponding to the lower boundary of the lowest energy bin). Also these images are affected by the lost counts.

SUMMARY OF THE INVENTION

It is an object of the present invention to improve a photon-counting radiation detector such that the number of lost counts is reduced.

In one aspect, the invention suggests a radiation detector for registering incident photons, comprising (i) detection circuitry configured to provide an electric output signal in response to incident photons, the output signal comprising pulses having an amplitude indicative of energies deposited in the radiation detector by the incident photons, and (ii) an energy estimating circuit configured to detect that the output signal is larger than at least one threshold corresponding to an energy value in order to determine energies of incident photons. The radiation detector further comprises a registration circuit configured to detect incident photons independent of a comparison of the output signal with the at least one threshold.

Since the radiation detector is configured to detect incident photons independent of a comparison with the at least one threshold on the basis of which the photon energies are determined, it is possible to detect incident photons without the drawbacks of the photon detection on the basis of this comparison. This allows for reducing the number of lost counts.

In one embodiment, the detection circuitry comprises (i) a conversion element producing a pulse-like current signal in response to a photon incident onto the conversion element, (ii) an integrating amplifier coupled to the conversion element an producing a step-like signal portion in response to the pulse-like current signal and (iii) a shaper circuit configured to process the step-like signal portions to generate the aforementioned output signal. The registration circuit may detect incident photons on the basis of the output signal of the shaper circuit and/or on the basis of the output signal of the amplifier.

When the registration circuit detects incident photons on the basis of the output signal of the shaper circuit, the registration circuit may particularly comprise a maximum detector configured to detect and/or count local maxima of the output signal. By detecting local maxima of the output signal (instead of a crossing of a threshold) it is particularly possible to distinguish between pulses of the output signal, when these pulses overlap such that the output signal does not fall below a certain value between the pulses. Thus, incident photons producing such pulses in the output signal can be detected separately. In particular, each local maximum being detected and/or counted as an incident photon.

In a further embodiment, the output signal is a voltage signal and the maximum detector comprises a peak detector circuit including a capacitor which is charged substantially to the value of the output signal, when the voltage of the signal increases and which holds its charge when the value of the output signal decreases.

In a further embodiment, the maximum detector includes a comparator circuit configured to detect an incident photon when the value of the output signal falls below the voltage across the capacitor. This situation occurs when the output signal decreases after the occurrence of a local maximum. Thus, the comparator can detect local maxima of the output signal by detecting such a situation.

Moreover, one embodiment comprises that the capacitor is discharged when the value of the output signal falls below the voltage across the capacitor. This means that the capacitor is discharged or "reset" after the occurrence of a local maximum of the output signal. After having been discharged, the capacitor can be charged again as explained above in order to allow for the detection of the next local maximum of the output signal.

When registration circuit detects incident photons on the basis of the output signal the integrating amplifier, the registration circuit may particularly be configured to detect and/or count step-like portions of the signal produced by the integrating amplifier as an incident photons. In this implementation, the output signal of the integration amplifier is used instead of or in addition to the aforementioned output signal of the shaper in order to detect incident photons. Usually, the output signal of the integrating amplifier allows for a faster detection of incident photons. However, it is more affected by noise. Thus, the output signal of the integrating amplifier may particularly be evaluated for detecting incident photons in applications in which a fast detection is more important than a reliable detection.

In one embodiment, the radiation detector is configured to output a number and/or rate of incident photons with respect to each of a plurality of predetermined photon energy ranges, the photon energy ranges being defined based on the at least one threshold. In a related embodiment, the radiation detector is configured to additionally output a number and/or rate of photons detected in the registration circuit.

In a further related embodiment, the radiation detector is configured to determine the number and/or rate of incident photons with respect to each of the plurality of predetermined photon energy ranges on the basis of detections of photons in the registration circuit. In particular, the radiation detector may be configured to determine the number and/or rate of incident photons with respect to one predetermined energy range on the basis of number of photons detected in the registration circuit while the output signal is larger than a threshold corresponding to a lower boundary of the energy range.

In a further embodiment, the radiation detector is configured to assign a detected local maximum to an energy range pertaining to the highest threshold crossed by the output signal at the time of the detection of the local maximum and to detect a photon having an energy in said range based on the detection of the local maximum. For each threshold and each associated energy range an associated comparator may check whether the output signal exceeds the threshold. Thus, the local maximum may be assigned to the highest energy range associated with a comparator that outputs a signal having a value larger then zero at the time of the occurrence of the local maximum.

In a further aspect, the invention suggests a method for detecting photons using a radiation detector as defined in claim 1. The method comprises (i) receiving the electric output signal of the detection circuit, the output signal comprising pulses having an amplitude indicative of energies deposited in the radiation detector by the incident photons, (ii) detecting that the output signal is larger than at least one threshold corresponding to an energy value in order to determine energies of incident photons, and (iii) additionally detecting and/or counting incident photons independent of a comparison of the output signal with the at least one threshold.

It shall be understood that the radiation detector and the method have similar and/or identical preferred embodiments, in particular, as defined in the dependent claims.

It shall be understood that a preferred embodiment of the present invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

Figure 1:
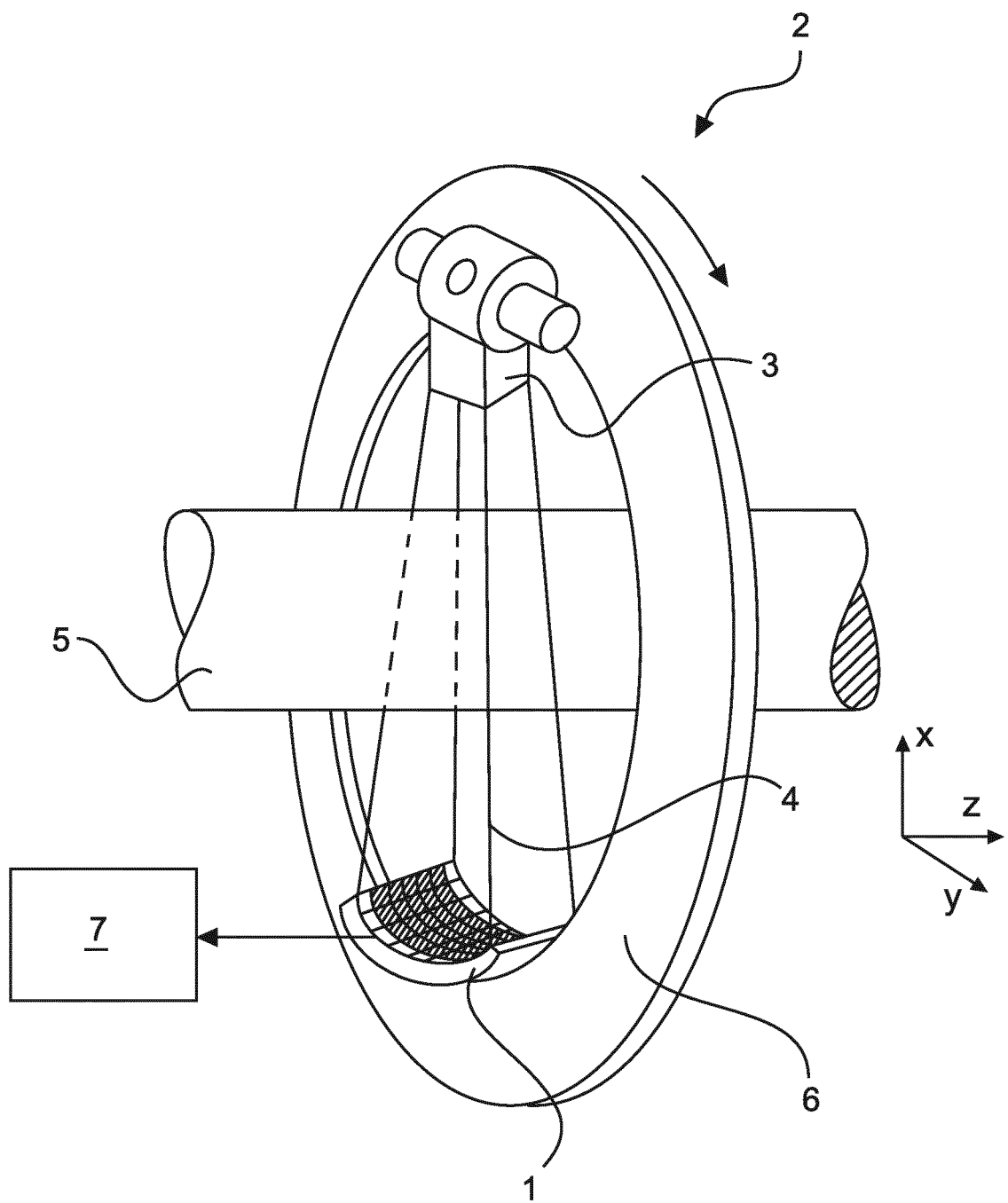
FIG. 1 schematically and exemplarily shows a computed tomography imaging device comprising a radiation detector according to the invention, FIG. 2 schematically and exemplarily illustrates a detector element of radiation detector, and FIGS. 3a-3c schematically and exemplarily illustrates results of a simulation of the operation of a detector element of the radiation detector.

FIG. 1 schematically and exemplarily illustrates a spectral or photon-counting radiation detector 1 which is capable of detecting individual incident x-ray photons and of determining their energies in accordance with predetermined energy ranges or bins. In the illustrated embodiment, the radiation detector 1 is included in a computed tomography (CT) imaging device 2 for generating three-dimensional images of objects for medical or other purposes. However, the radiation detector 1 may likewise be utilized in other applications than CT imaging.

In addition to the x-ray-detector 1, which will be explained in detail further below, the CT imaging device 2 comprises an radiation source 3, such as an x-ray tube, that produces an x-ray beam 4 that traverses an examination region 5 between the radiation source 3 and the radiation detector 1, which comprises the object to be imaged. The x-ray radiation having traversed the examination region is collected by the radiation detector 1. The radiation detector 1 and the radiation source 3 may be mounted at opposing positions on a rotatable gantry 6 which can be rotated around the object positioned within the examination region 5. Moreover, the object and the gantry 6 can be moved relative to each other in the axial direction of the gantry 6 (z-direction). Thus, different angular projections can be acquired when the gantry 6 is rotated around the object, where each projection corresponds to one angular position of the radiation source 3 and the radiation detector 1 relative to the object to be imaged, and by moving the object and the gantry 6 relative to each other in the z-direction, different so-called slices of the object can be imaged.

The radiation detector 1 is coupled to a reconstruction unit 7 which reconstructs three-dimensional CT images on the basis of the measurement data collected by the radiation detector 1 and which may be configured as a computer device which comprises one or more processor units to execute computer programs implementing the routines carried out by the reconstruction unit 7. The measurement data provided by the radiation detector 1 are projections of the object, and images can be reconstructed from these projections in a way known to a person skilled in the art as such.

Using the information about the energies of the photons detected by the radiation detector 1, the reconstruction unit 7 is capable of generating spectral CT images. In so doing, the reconstruction unit 7 may generate sub-images for each energy bin. These sub-images may be further processed or evaluated separately, or the reconstruction unit 7 may combine the sub-images to form a combined image, e.g. on the basis of energy-dependent weighting of the sub-images. In addition, the reconstruction unit 7 may be configured to generate conventional CT images which do not include information derived from the photon energies. For each CT scan carried out with the CT device 2, the reconstruction unit 7 may generate one or more spectral CT images, a conventional CT image or both spectral and conventional images, particularly depending on the intended further evaluation of the CT image(s).

As said, the radiation detector 1 is adapted to detect single incident x-ray photons and allows for determining their energies in accordance with a number of predefined energy bins. In this regard, a photon incident into the radiation detector 1 produces an electric charge cloud of charge carriers (electrons and holes) which drift to the detector electrodes, where the amount of charge depends on the energy of the incident x-ray photon. The generated charges are collected by read-out electronics of the radiation detector 1, which in turn generate an electrical signal (e.g. a voltage signal) the amplitude of which is proportional to the energy of the impinging x-ray photon. On this basis of this signal, the read-out electronics are capable of determining the photon energies. In addition, the read-out electronics are configured to determine the rate of incident photons as will be explained herein below.

More specifically, the radiation detector 1 may comprise a plurality of detector elements 201, which are usually also referred to as tiles and which are preferably arranged in an array that may be flat or concave. Thus, the detector elements 201 are arranged in the form of rows and columns arranged substantially perpendicular to each other. As schematically and exemplarily depicted in FIG. 2, each detector element 201 comprises a converter element 202 for converting X-rays into electrical signals, and read-out electronics coupled to the converter element 202. The read-out electronics may be implemented in a CMOS ASIC structure attached to the anode side of the converter element 202, for example.

The converter element 202 is provided between a cathode contact assembly 203 and an anode contact assembly 204 and is made of a semiconductor material. Suitable semiconductor materials include, for example, cadmium telluride (CdTe), cadmium zinc telluride (CdZnTe), cadmium tellurium selenide (CdTeSe), CdZnTeSe, cadmium manganese telluride (CdMnTe), silicon (Si), gallium arsenide (GaAs), perovskites and mercury iodide (HgI). In operation, the cathode contact assembly 203 is generally held on a lower electric potential than the anode contact assembly 204 (i.e. a negative bias voltage is applied to the cathode contact assembly 203 with respect to the anode contact assembly 204) so that an electric field is formed between the cathode contact assembly 203 and the anode contact assembly 204 within the converter element 202. X-ray photons may enter into the converter element 202 through the cathode contact assembly 203.

The converter element 202 may be configured as a substantially cubic block and its lateral dimensions may be much larger than its thickness. The cathode contact assembly 203 and the anode contact assembly 204 may be connected to the large top and bottom sides of the converter element 202 so that the electric field extends along the smaller thickness direction of the converter element 202. Further, the cathode contact assembly 203 may be configured as a continuous cathode electrode, which may be formed by a thin metalized film applied onto the converter element 202.

In contrast, the anode contact assembly 204 may include pixelated anode electrodes 205, i.e. separated anode electrodes 205 which are arranged in certain distances to each other and which are usually also referred to as anode pixels. In one embodiment, these anode pixels 205 are also arranged in rows and columns, which are substantially perpendicular to each other, on the surface of the conversion element 202. The anode electrodes or pixels 205 collect charge produced by photons incident on the converter element 202 and each anode pixel is connected to read-out electronics which collect the resulting current and determine the measurement data which are subsequently provided to the reconstruction unit 7.

When an x-ray photon enters into the converter element 202, it excites the semiconductor material and thereby generates electric charge carriers (electrons and holes). The negative charge carriers drift to one of the anode electrodes 205 under the influence of the electric field in the converter element 202 and produce a pulse-like electric signal which is collected by the read-out electronics.

For each anode electrode 205, the read-out electronics may include an amplifier 206, such as a charge sensitive amplifier, which integrates the input current over each pulse (i.e. each incident x-ray photon) and produces a corresponding step-like output voltage signal, where the height of the step corresponds to the integrated charge and, thus, to the photon energy deposited in the converter element 202. The amplifier output signal is preferably filtered in a so-called pulse shaper circuit 207 to produce a voltage signal in which each step generated by the amplifier 206 corresponds to a pulse having a certain width and a gradually rounded maximum, the amplitude of which is proportional to the height of the step (i.e. to the integrated charge of the charge cloud generated by an incident x-ray photon) and, thus, to the energy of the incident photon. For this purpose, the pulse shaper circuit 207 particularly sets the duration of the pulse. Thus, the pulse shaper circuit 207 limits the decay time of the step like output signal of the amplifier 206, which corresponds to a pulse having a very long decay time. In addition, the pulse shaper circuit 207 increases the rise time of the step-like amplifier output signal.

Further, the read-out electronics comprise two or more comparators $208_1, \ldots, 208_N$, where each comparators $208_1, \ldots, 208_N$ compares the output signal of the shaper circuit 207 with an associated predetermined threshold value $S_i$ ($i=1, \ldots, N$) and produces an output signal greater than zero, (only) if the output of the shaper circuit 207 exceeds the threshold value $S_i$. The threshold values $S_i$ of these comparators $208_1, \ldots, 208_N$ represent the boundaries of the aforementioned energy bins. They may be selected such that a pulse in the output signal of the shaper circuit 207, which corresponds to a photon having an energy within a range corresponding to a certain energy bin, has an amplitude between the threshold values corresponding to the upper and lower boundaries for the energy bin. The corresponding configuration of the threshold values $S_i$ may be provided within the scope of a calibration procedure of the x-ray device 2, which may be carried out in a way known to the person skilled in the art as such.

Conventionally, the output of each comparator $208_1, \ldots, 208_N$ may be connected to an associated counter $209_1, \ldots, 209_N$ for counting the number of photons registered in the comparator $208_1, \ldots, 208_N$. To this end, each counter $209_1, \ldots, 209_N$ may count the rising edges of the output signal of the associated comparator $208_1$, ..., $208_N$. On the basis of the counted number of photons, the read-out electronics may determine the rate of photon registrations (i.e. the number of photon registrations per unit time interval) for each energy bin.

In accordance with this configuration, each detected photon produces a count with respect to the energy bin corresponding to its energy and with respect to the lower energy bins. Thus, the rate of detected photons within a certain energy bin can be determined on the basis of differences between the rates of photon registrations for the energy bins. In particular, the photon rate for the highest energy bin correspond to the number of registered photons with an energy in this energy bin. The number of registered photons with energies in a lower energy bin can determined on the basis of the differences between the number of photons with an energy in the next-higher bin and the counts for the respective energy bin.

In such a way, the detected rate of incident photons per energy bin can be determined. This determination may be made in the read-out electronics, and the determined rate information may be provided to the reconstruction unit 7 via a processing circuit 210 of the read-out electronics. As an alternative, the rates of photon registrations for each energy bin may be provided to the reconstruction unit 7, and the reconstruction unit 7 may determine the rate of photons per energy bin as explained above.

On the basis of the photon rate per energy bin, the reconstruction unit 7 may reconstruct spectral images of the object positioned in the examination region 5 for each of the energy ranges corresponding to the energy bins. These images correspond to the aforementioned sub-images, which may be further evaluated separately or which may be combined to form a single x-ray image. Moreover, the reconstruction unit 7 can also generate conventional images on the basis of the number and/or rate information. For this purpose, the overall photon rate may be determined, which corresponds to the sum of the photon rates for all energy bins and the image is generated on the basis of this overall photon rate.

The radiation detector 1 with the read-out electronics described above can reliably determine lower incident photon rates. However, photons may not be counted or associated with a wrong energy bin in case of higher incident photon rates. This affects both spectral and conventional CT image generation.

One reason for such lost or incorrectly classified counts is that individual photons are only registered by each of the counters $209_1$, ..., $209_N$ when the output signal of the shaper circuit 207 crosses the threshold assigned to the relevant comparator $208_1$, ..., $208_N$ from a value below the threshold to a value above the threshold. Thus, a registration of a photon in the counters $209_1$, ..., $209_N$ (with a correct energy) requires that the output signal of the shaper circuit 207 falls to zero or at least below the lowest threshold between two pulses corresponding to consecutive incident photons. This may not be the case for higher photon rates even if the conversion element 202, the amplifier 206 and the shaper 207 can resolve consecutive photons (i.e. if the output signal of the shaper 207 comprises distinct peaks corresponding to the photons), since the pulses in the output signal of the shaper 207 may overlap such that the signal does not fall below the relevant threshold(s) between the pulses.

In order to solve this problem, the radiation detector 1 comprises a registration circuit 211 for registering incident photons independent of their energies and the aforementioned thresholds associated with the comparators $208_1$, ..., $208_N$. In one implementation, the registration circuit provides an output signal which includes pulses at times at which the registration circuit 211 detects an incident photon. Preferably, these pulses are relative narrow in order to avoid overlapping pulses in case of a high photon rate. On the other hand, the pulses are sufficiently broad to be reliable detected in the subsequent processing of the output signal of the registration circuit 211.

In this regard, the pulses of the output signal of the registration circuit 211 may be counted by means of a counter 212 in order to determine the overall number or rate of incident photons. In this case, the overall rate information may be output by the radiation detector 1 and provided to the reconstruction unit 7 in addition to the rate information for the energy bins determined by means of the counters $209_1$, ..., $209_N$. Using only the addition overall rate information the reconstruction unit 7 may generate conventional CT images in one embodiment. Spectral CT images may be generated on the basis of the rate information for the energy bins determined in the conventional way as explained above.

In a further embodiment, the read-out electronics may determine the photon rate for the energy bins on the basis of the output signal provided by the registration circuit 211. In particular, the read-out electronics may assign each pulse of the output signal of the registration circuit 211 to one or more energy bins and may determine the photon rates for the energy bins on the basis of the number of pulses assigned to the energy bins. In so doing, the read-out electronics may assign a pulse of the output signal of the registration circuit 211 to the highest energy bin associated with a comparator $208_1$, ..., $208_N$ that outputs a signal having a value larger than zero at the time at which the pulse occurs. As will be apparent from the description above, this energy bin corresponds to the energy of the photon as determined on the basis of the output signal of the shaper circuit 207. The association may be determined in the processing circuit 210 of the read-out electronics on the basis of a corresponding algorithm implemented in the processing circuit 210. When the association is made for each pulse of the output signal of the registration circuit 211 (i.e. for each registered photon), the read-out electronics can determine the number of incident photons for each energy bin and the corresponding photon rates for each energy bin. The counters $209_1$, ..., $209_N$ can be dispensed with for this determination.

The determined rate information for the energy bins may be provided to the reconstruction unit 7 so that the reconstruction unit 7 can generate spectral CT images on the basis of this information. In addition, the radiation detector 1 may provide the overall rate information which may be determined using the counter 212 as explained above. On the basis of the overall rate information, the reconstruction unit 7 may generate conventional images. Likewise, the reconstruction unit 7 may determine an overall rate information on the basis of the rate information for the individual energy bins in order to determine conventional images. In this case, the radiation detector 1 may not provide the overall rate information as an output signal in one implementation.

Using the rate information determined on the basis of the signals provided by the registration circuit 211 and the counter 212, the rate of photon events can be detected, which can be resolved by the conversion element 202, the amplifier 206 and the shaper circuit 207. However, the incident photon rate may exceed the resolution of the conversion element 202, the amplifier 206 and the shaper circuit 207. In particular, two or more photons arriving within a short time interval may produce a single pulse corresponding to the overall energy of the photons so that it is not possible to distinguish between distinct pulse peaks with respect to such photons. In this case, the photon rate determined on the basis of the signal provided by the registration circuit 211 and the counter 212 does not correspond to the true rate of incident photons, which is higher. Moreover, the photon energies cannot be directly derived from output of the comparators $208_1, \ldots, 208_N$ in this case, since the photons produce a single pulse having an amplitude corresponding to a higher energy than the photon energies.

In order to be able to generate accurate conventional and/or spectral images in this case, the true rate of incident photons may be estimated by the read-out electronics of the radiation detector 1 or by the reconstruction unit on the basis of a model describing the response of the radiation detector 1 to an incident (high) photon flux. Using such a detector model, the true overall photon rate may be estimated in order to generate conventional x-ray images on the basis of this estimate and/or the true photon rates may be estimated for each energy bin in order to generate spectral images. In order to estimate the true photon rates for the energy bins, the energies of the photons are estimated on the basis of the output signals of the comparators $208_1, \ldots, 208_N$. This estimation is made in addition to the estimation of the true photon rate using a correspondingly extended detector model which also takes the values of the amplitudes of the output signal of the shaper circuit 207 into consideration.

In order to determine the true photon rate, the applied model may particularly describe the response of the registration circuit 211 and the counter 212 to an incident photon flux. Since the registration circuit registers incident photons independent of their energies, this response is a monotonic function of the incident flux. This allows for using a model with a relatively low complexity. One exemplary model, which may be used, is described in the publication E. Roessl et al., "On the analogy between pulse-pile up in energy sensitive, photon counting detectors and level-crossing of shot noise", Proc. SPIE 9783, Medical Imaging 2016: Physics of Medical Imaging, 97831H (25 Mar. 2016); doi: 10.1117/12.2216909. This publication discloses a model for the level crossing of a detector signal in response to an incident photon flux. This model can be applied to the response of the registration circuit 211 to an incident photon flux when considering the time derivative of the output signal of the shaper circuit 207 as the relevant detector signal and when considering a downward crossing of the value zero, since the registration circuit 211 effectively registers downward zero-crossings of this time derivative.

Using such a model, the true incident photon rate may be estimated using the rate information determined on the basis of the signals provided by the registration circuit 211 and the counter 212 for the overall photon rate and/or the photon rates for the individual energy bins as explained above. In addition the true energies of the photons may be estimated. For this purpose, the output signals of the comparators $208_1, \ldots, 208_N$ may be taken into consideration and the model may be extended to describe the relationship between these output signals and the photon energies which are to be determined.

In one embodiment, the registration circuit 211 is configured as a maximum detector which is configured to detect local maxima of the output signal of the shaper circuit 207, and each detected local maximum is regarded as a photon event. In order to further evaluate the detection of maxima as explained above, the maximum detector may provide an output signal may comprise a narrow pulse at each occurrence of a local maximum of the output signal of the shaper circuit 207.

Figure 2:
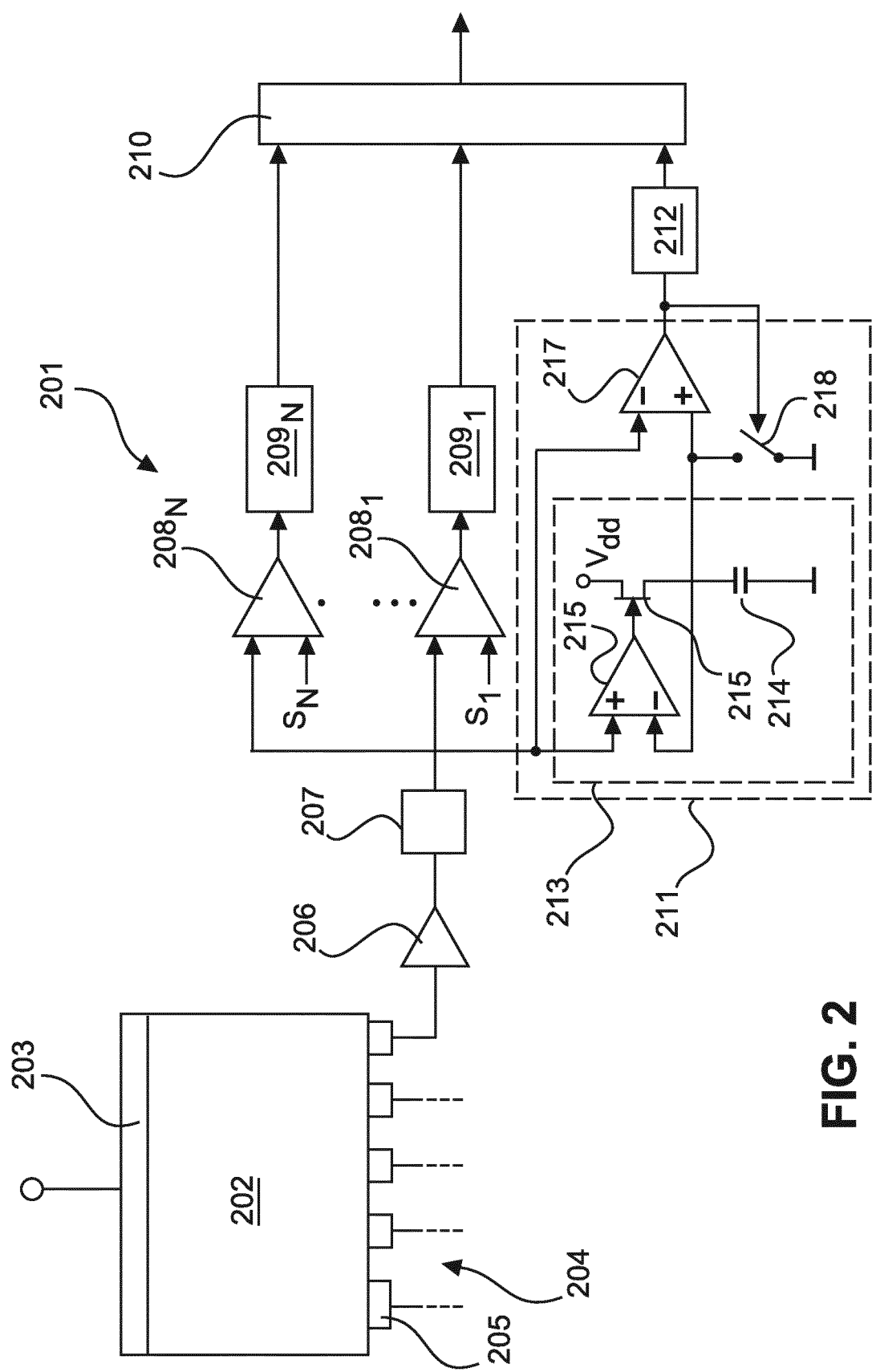

In one implementation of this embodiment, which is schematically and exemplarily illustrated in FIG. 2, the registration circuit 211 may comprises a peak holder circuit 213 which receives the output signal of the shaper circuit 207. The peak holder circuit 213 includes a capacitor 214, which is charged to the value of the output signal of the shaper circuit 207 when the voltage of the shaper circuit 207 increases and holds its charge for a certain amount of time when the value of the output signal of the shaper circuit 207 decreases. As will become apparent from the following description, the actual value of the voltage across the capacitor is not evaluated in the registration circuit 211. This particularly means that the resistance of the capacitor 214 and the resulting charge leakage is substantially irrelevant. The capacitor 214 can therefore have a small capacitance, e.g. in the range of some femtofarad. Such a capacitor 214 can be charged and discharged quickly so that the capacitor voltage closely follows the value of the output signal of the shaper circuit 207.

In order to charge the capacitor 214, the output signal of the shaper circuit 207 may be fed to the non-inverting input of an operational amplifier 215, and the capacitor may be charged via the output of the operational amplifier and a further component. The capacitor voltage may further be provided to the inverting input of the operational amplifier 215 so that a closed loop is established. In such a configuration, the operational amplifier 215 attempts to control its output such that the difference between voltages at the inputs, i.e. the value of the output signal of the shaper circuit 7 and the capacitor voltage, becomes zero. The further component is selected such that the output signal of the operational amplifier 215 effects a charging of the capacitor 214 when the value of the output signal of the shaper circuit 207 is larger than the capacitor voltage and that the output signal of the operational amplifier 215 does not change the capacitor voltage in case the value of the output signal of the shaper circuit 207 is smaller than the capacitor voltage.

In the implementation illustrated in FIG. 2, the further component is a transistor 216, particularly a junction gate field-effect transistor (JFET), via which the capacitor 214 is connected to a voltage source ($V_{dd}$). The output of the operational amplifier is connected to the gate contact of the transistor 216, and the transistor is configured such that the output signal of the operational amplifier 215 in case of a positive voltage difference at its inputs (i.e. in case the output signal of the shaper circuit 207 is larger than the capacitor voltage) controls the transistor 216 to be in a conductive state so that the capacitor 214 is charged and that the output signal of the operational amplifier 215 switches the transistor 216 off (so that it is not conducting) in case of a negative voltage difference at its inputs.

In further possible implementations, the further component can be configured in a different way. For instance, the further component may be a diode and the output of the operational amplifier 215 may be connected to the capacitor 214 via the diode. Thus, the capacitor 214 can be charged via the output of the operational amplifier 214 in case of a positive voltage difference at its inputs and the diode can prevent discharging of the capacitor 214 in case of a negative voltage difference at the inputs of the operational amplifier 214.

In addition, the registration circuit 211 of this embodiment comprises a comparator 217, which compares the value of the output signal of the shaper circuit 207 with the voltage across the capacitor 214. The comparator 217 may output a zero signal when the capacitor voltage is smaller than the value of the output signal of the shaper circuit 207. When the capacitor voltage is larger than the value of the output signal of the shaper circuit 207 (i.e. when the voltage output signal begins to decrease after occurrence of a local maximum), the comparator 217 outputs a signal larger than zero.

The output signal of the comparator 217 also controls a switch 218 which can short-circuit the capacitor 214. The switch 218 is controlled such that it is closed (i.e. conductive) if the output signal of the comparator 217 is larger then zero and that it is open (i.e. non-conductive) otherwise. Thus, the capacitor 214 is discharged or "reset" when the output signal of the comparator 217 becomes larger then zero, i.e. when a local maximum of the output signal of the shaper circuit 207 is detected. Thereupon, the capacitor 214 can be charged again until the next local maximum of the output signal of the shaper circuit 207 occurs. Moreover, the output signal of the comparator 217 becomes zero again (due to the discharged capacitor 214).

Thus, the comparator 217 outputs a pulse at each occurrence of a local maximum of output signal of the shaper circuit 207.

Figure 3A:
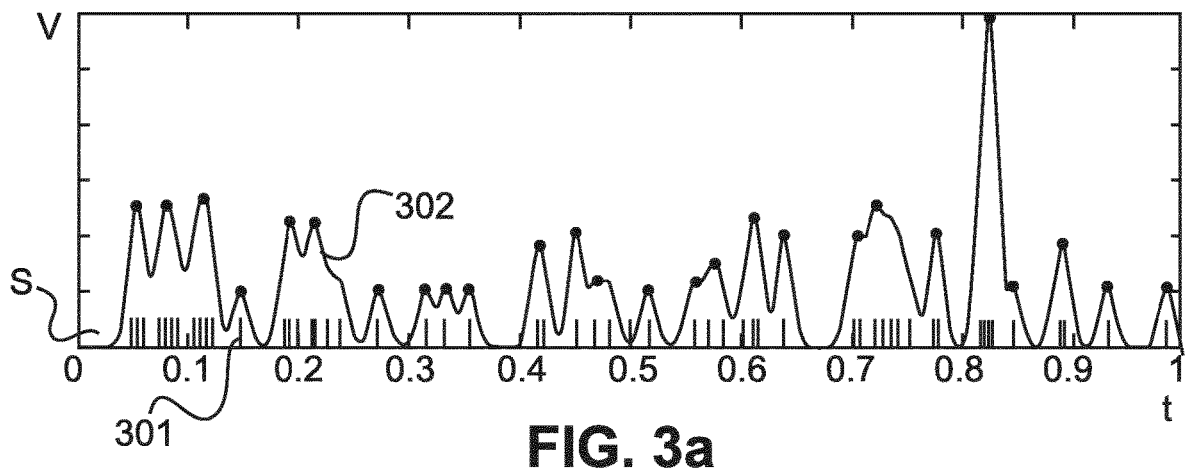
Figure 3B:
Figure 3C:
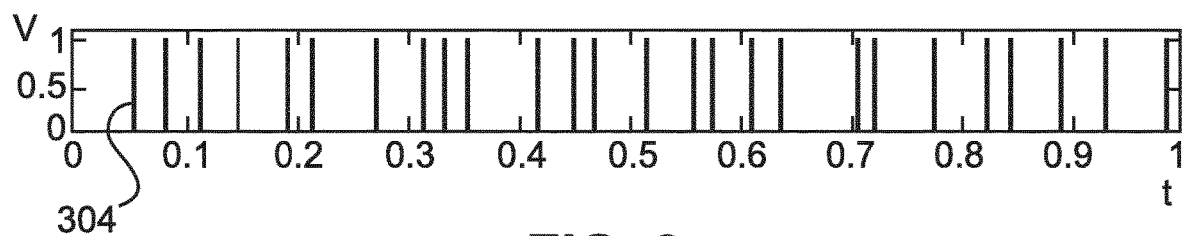

In FIGS. 3a-3c, results of a simulation of the operation of the read-out electronics comprising a registration circuit 211 in the aforementioned embodiment are schematically and exemplarily illustrated.

FIG. 3a illustrates a sequence of 61 incident photons having an energy of 100 keV, where each photon event is illustrated by means of a pulse (one pulse is provided with the numeral 301). Further, FIG. 3a shows the output signal 302 of the shaper circuit 207 generated in response to the incident photons. As can be seen in FIG. 3a, the output signal of the shaper circuit 207 comprises pulses with a certain width, where each pulse corresponds to one incident photon or a number of incident photons which cannot be resolved in the conversion element 202, the integrating amplifier 206 and the shaper circuit 207 (due to the so-called pile-up effect) and, thus, are registered as a single event with a higher energy. Moreover, some of the pulses in the signal 302 overlap such that the signal 302 does not fall to zero between these pulses.

FIG. 3b illustrates the output signal 303 of one of the comparators $208_1, \ldots, 208_N$, which compares the voltage of the signal 302 with a threshold value S corresponding to a photon energy of 25 keV. As can be seen in FIG. 3b, the signal 303 does not allow for distinguishing between photons when the signal 302 does not fall below the threshold between the pulses corresponding to such photons. As a result, it is possible to detect 13 photon events, and it is not possible to detect all photon events which can be resolved by the conversion element 202, the integrating amplifier 206 and the shaper circuit 207 (i.e. which produce a local maximum of the signal 302).

FIG. 3c illustrates the output signal 304 of the registration circuit 211 which detects local maxima of the signal 302. As can be seen in FIG. 3c, it is possible to detect all photons which can be resolved in the conversion element 202, the integrating amplifier 206 and the shaper circuit 207. For the sequence of photons shown in FIG. 3a, this means that it is possible to detect 26 photon events. Thus, it is possible to detect significantly more photons on the basis of the output signal 304 of the registration circuit 211 than on the basis of the output signal 303 of the comparator $208_1, \ldots, 208_N$. In order to estimate the true number of incident photons (61 in the example shown in FIG. 3) a detector model may be used as explained above.

In a further embodiment, the registration circuit 211 does not process the output signal of the shaper circuit 207 in order to determine the number of incident photons. Rather, the registration circuit 211 processes the output signal of the charge sensitive amplifier 206. As said above, this signal comprises a step at each photon event (where the height of the step is indicative of the photon energy). In order to evaluate this signal to detect photon events, the registration circuit 211 may be configured to detect such steps in the output signal of the charge sensitive amplifier 206 and to output a narrow pulse (as in the embodiment described above) in case such a step is detected. To this end, the registration circuit 211 of this embodiment may comprise a capacitor, the voltage of which follows the value of the output signal of the integrating amplifier 206 with a certain small delay. A circuit comprising a comparator may compare the capacitor voltage with the value of the output signal of the integrating amplifier 206 in order to detect the steps and may produce a corresponding output signal.

Since the output signal of the integrating amplifier 206 is less affected by processing delay compared with the output signal of the shaper circuit 207, the evaluation of the output signal of the integrating amplifier allows for a more accurate (i.e. faster) detection of the times at which the photons enter into the radiation detector 1. However, the output signal of the integrating amplifier 206 is usually more affected by noise so that there is increase of false detection when evaluating the output signal of the integrating amplifier 206.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A computer program may be stored/distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The invention claimed is:

1. A radiation detector for registering incident photons, comprising:
   detection circuitry configured to provide an electric output signal in response to incident photons, the output signal, being a voltage signal, comprising pulses having an amplitude indicative of energies deposited in the radiation detector by the incident photons;
   an energy estimating circuit configured to detect that the output signal is larger than at least one threshold corresponding to an energy value in order to determine energies of incident photons; and
   a registration circuit configured to detect incident photons independent of a comparison of the output signal with the at least one threshold, wherein the registration circuit comprises a maximum detector configured to detect and/or count local maxima of the output signal, the maximum detector comprising:
       a peak detector circuit which includes a capacitor charged substantially to the value of the output signal when a voltage of the signal increases and which holds a charge when the value of the output signal decreases, and a comparator circuit configured to detect a local maximum of the output signal when the value of the output signal falls below the voltage across the capacitor.

2. The radiation detector according to claim 1, wherein the detection circuitry comprises:

a conversion element producing a pulse-like current signal in response to a photon incident onto the conversion element;

an integrating amplifier coupled to the conversion element and producing a step-like signal portions in response to the pulse-like current signal; and a shaper circuit configured to process the step-like signal portions to generate the output signal.

3. The radiation detector according to claim 2, wherein the registration circuit is configured to detect and/or count step-like portions of the signal produced by the integrating amplifier as the incident photons.

4. The radiation detector according to claim 1, wherein a number and/or rate of incident photons with respect to each of a plurality of predetermined photon energy ranges is output, the photon energy ranges being defined based on the at least one threshold.

5. The radiation detector according to claim 4, wherein the number and/or rate of photons detected in the registration circuit is output.

6. The radiation detector according to claim 4, wherein the number and/or rate of incident photons with respect to each of the plurality of predetermined photon energy ranges is determined based on detections of photons in the registration circuit.

7. The radiation detector according to claim 6, wherein the number and/or rate of incident photons with respect to one predetermined energy range is determined based on number of photons detected in the registration circuit while the output signal is larger than a threshold corresponding to a lower boundary of the energy range.

8. A method for detecting photons, comprising:

providing, by detection circuitry, an electric output signal in response to incident photons, the output signal, being a voltage signal, comprising pulses having an amplitude indicative of energies deposited in the radiation detector by the incident photons;

detecting, by an energy estimating circuit, the output signal being larger than at least one threshold corresponding to an energy value in order to determine energies of incident photons; and detecting, by a registration circuit, incident photons independent of a comparison of the output signal with the at least one threshold, wherein the registration circuit comprises a maximum detector configured to detect and/or count local maxima of the output signal, the maximum detector comprising:

a peak detector circuit which includes a capacitor charged substantially to the value of the output signal when a voltage of the signal increases and which holds a charge when the value of the output signal decreases, and a comparator circuit configured to detect a local maximum of the output signal when the value of the output signal falls below the voltage across the capacitor.

9. The radiation detector according to claim 1, wherein the capacitor is discharged when the value of the output signal falls below the voltage across the capacitor.

10. The radiation detector according to claim 9, wherein a detected local maximum is assigned to an energy range pertaining to the highest threshold crossed by the output signal at the time of the detection of the local maximum, and a photon having an energy in said range is detected based on the detection of the local maximum.

* * * * *